(12) United States Patent
Tran

(10) Patent No.: US 10,531,288 B2
(45) Date of Patent: Jan. 7, 2020

(54) DATA MANAGEMENT MICROSERVICE IN A MICROSERVICE DOMAIN

(71) Applicant: Intel Corporation, Santa Clara, CA (US)

(72) Inventor: Dzung D Tran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/092,853

(22) PCT Filed: Jun. 30, 2016

(86) PCT No.: PCT/US2016/040409
§ 371 (c)(1),
(2) Date: Oct. 11, 2018

(87) PCT Pub. No.: WO2018/004602
PCT Pub. Date: Jan. 4, 2018

(65) Prior Publication Data
US 2019/0124504 A1 Apr. 25, 2019

(51) Int. Cl.
*H04W 12/02* (2009.01)
*H04L 29/08* (2006.01)
(Continued)

(52) U.S. Cl.
CPC ........ *H04W 12/02* (2013.01); *G06F 16/2379* (2019.01); *H04L 65/1073* (2013.01);
(Continued)

(58) Field of Classification Search
CPC ........... H04W 4/00; H04W 4/12; H04W 4/14; H04W 4/16; H04W 8/00; H04W 8/02;
(Continued)

(56) References Cited

U.S. PATENT DOCUMENTS 6,779,030 B1 * 8/2004 Dugan .............. H04M 3/42136
379/221.08
2006/0123070 A1 6/2006 Hickson
(Continued)

FOREIGN PATENT DOCUMENTS

EP 2254310 A2 11/2010

OTHER PUBLICATIONS

"Block Storage", OpenStack Docs, [Online]. Retrieved from the Internet: URL: http: developer.openstack.org firstapp-libcloud block_storage.html, (Accessed Oct. 4, 2016), 1-9.
(Continued)

*Primary Examiner* — Jean A Gelin
(74) *Attorney, Agent, or Firm* — Schwegman Lundberg & Woessner, P.A.

(57) ABSTRACT

Disclosed in some examples are systems, methods, and machine readable mediums which provide for a data management microservice which registers and manages data across multiple microservices to reduce data fragmentation and to ensure correct disposal of this data upon request. In some examples, the data management microservice may include an erasure service which ensures that all data corresponding to a data characteristic is deleted.

23 Claims, 8 Drawing Sheets

(51) Int. Cl.
*G06F 16/23* (2019.01)
*H04L 29/06* (2006.01)
*H04W 8/18* (2009.01)

(52) U.S. Cl.
CPC .......... *H04L 67/1097* (2013.01); *H04L 67/26* (2013.01); *H04W 8/183* (2013.01)

(58) Field of Classification Search
CPC . H04W 8/18; H04W 8/22; H04W 8/30; G06F 2221/2143; G06F 3/0605; G06F 3/0607; G06F 3/0608; G06F 3/0614
See application file for complete search history.

(56) References Cited

U.S. PATENT DOCUMENTS

| | | | |
|---|---|---|---|
| 2007/0220323 A1* | 9/2007 | Nagata | G06F 11/2025 714/13 |
| 2009/0240727 A1 | 9/2009 | Sheehan | |
| 2011/0264704 A1 | 10/2011 | Mehra | |
| 2016/0124742 A1 | 5/2016 | Rangasamy et al. | |
| 2018/0004423 A1* | 1/2018 | Saito | H04M 11/00 |
| 2018/0004602 A1 | 1/2018 | Tran | |

OTHER PUBLICATIONS

"Getting started", OpenStack Docs, [Online]. Retrieved from the Internet: URL: http: developer.openstack.org firstapp-libcloud getting_started.html, (Accessed Oct. 4, 2016), 1-14.
"Introduction to the fractals application architecture", OpenStack Docs, [Online]. Retrieved from the Internet: URL: http: developer.openstack.org firstapp-libcloud introduction.html, (Accessed Oct. 4, 2016), 1-22.
"Advice for developers new to operations", OpenStack Docs, [Online]. Retrieved from the Internet: URL: http: developer.openstack.org firstapp-libcloud advice.html, (Accessed Oct. 4, 2016), 1-5.
"Going crazy", OpenStack Docs, [Online]. Retrieved from the Internet: URL: http: developer.openstack.org firstapp-libcloud craziness.html, (Accessed Oct. 4, 2016), 1-5.
"Networking", OpenStack Docs, [Online]. Retrieved from the Internet: URL:http: developer.openstack.org firstapp-libcloud networking.html, (Accessed Oct. 4, 2016), 1-27.
"Appendix", OpenStack Docs:, [Online]. Retrieved from the Internet: URL: http: developer.openstack.org firstapp-libcloud appendix.html, (Accessed Oct. 4, 2016), 1-4.
"Make it durable", OpenStack Docs, [Online]. Retrieved from the Internet: URL: http: developer.openstack.org firstapp-libcloud durability.html, (Accessed Oct. 4, 2016), 1-10.
"Orchestration", OpenStack Docs, [Online]. Retrieved from the Internet: URL: http: developer.openstack.org firstapp-libcloud orchestration.html, (Accessed Oct. 4, 2016), 1-17.
"Community support", OpenStack Docs, [Online]. Retrieved from the Internet: URL: http: developer.openstack.org firstapp-libcloud common app-support.html, (Accessed Oct. 4, 2016), 1-7.
"Glossary", OpenStack Docs, [Online]. Retrieved from the Internet: URL: http: developer.openstack.org firstapp-libcloud common glossary.html, (Accessed Oct. 4, 2016), 1-51.
"Scaling out", OpenStack Docs, [Online]. Retrieved from the Internet: URL: http: developeropenstack.org firstapp-libcloud scaling_out.html, (Accessed Oct. 4, 2016), 1-17.
"International Application Serial No. PCT US2016 040409, International Search Report dated Mar. 28, 2017", 3 pgs.
"International Application Serial No. PCT US2016 040409, Written Opinion dated Mar. 28, 2017", 5 pgs.
"International Application Serial No. PCT US2016 040409, International Preliminary Report on Patentability dated Jan. 10, 2019", 7 pgs.
Montesi, Fabrizio, "Hack your way through the microservices revolution", InfoWorld—p. 2 2, [Online]. Retrieved from the Internet: URL: : http: www.infoworld.com article 2903590 application-development hack-your-way-through-the-microservices-revolution.html, (Mar. 31, 2015), 11 pgs.
Montesi, Fabrizio, "Hack your way through the microservices revolution", InfoWorld—p. 1 2, [Online]. Retrieved from the Internet: URL: : http: www.infoworld.com article 2903590 application-development hack-your-way-through-the-microservices-revolution.html, (Mar. 31, 2015), 6 pgs.

\* cited by examiner

US 10,531,288 B2

DATA MANAGEMENT MICROSERVICE IN A MICROSERVICE DOMAIN

This application is a U.S. National Stage Filing under 35 U.S.C. 371 from International Application No. PCT/US2016/040409, filed on 30 Jun. 2016, and published as WO 2018/004602 on 4 Jan. 2018, which application is incorporated herein by reference in its entirety.

TECHNICAL FIELD

Embodiments pertain to improvements in computerized network services. Some embodiments relate to improved management of user data in computer network services.

BACKGROUND

Network based services are network accessible computers that provide processing resources and data to client computing devices. Example services include software as a service (SAAS) and network based file synchronization, storage, and backup.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
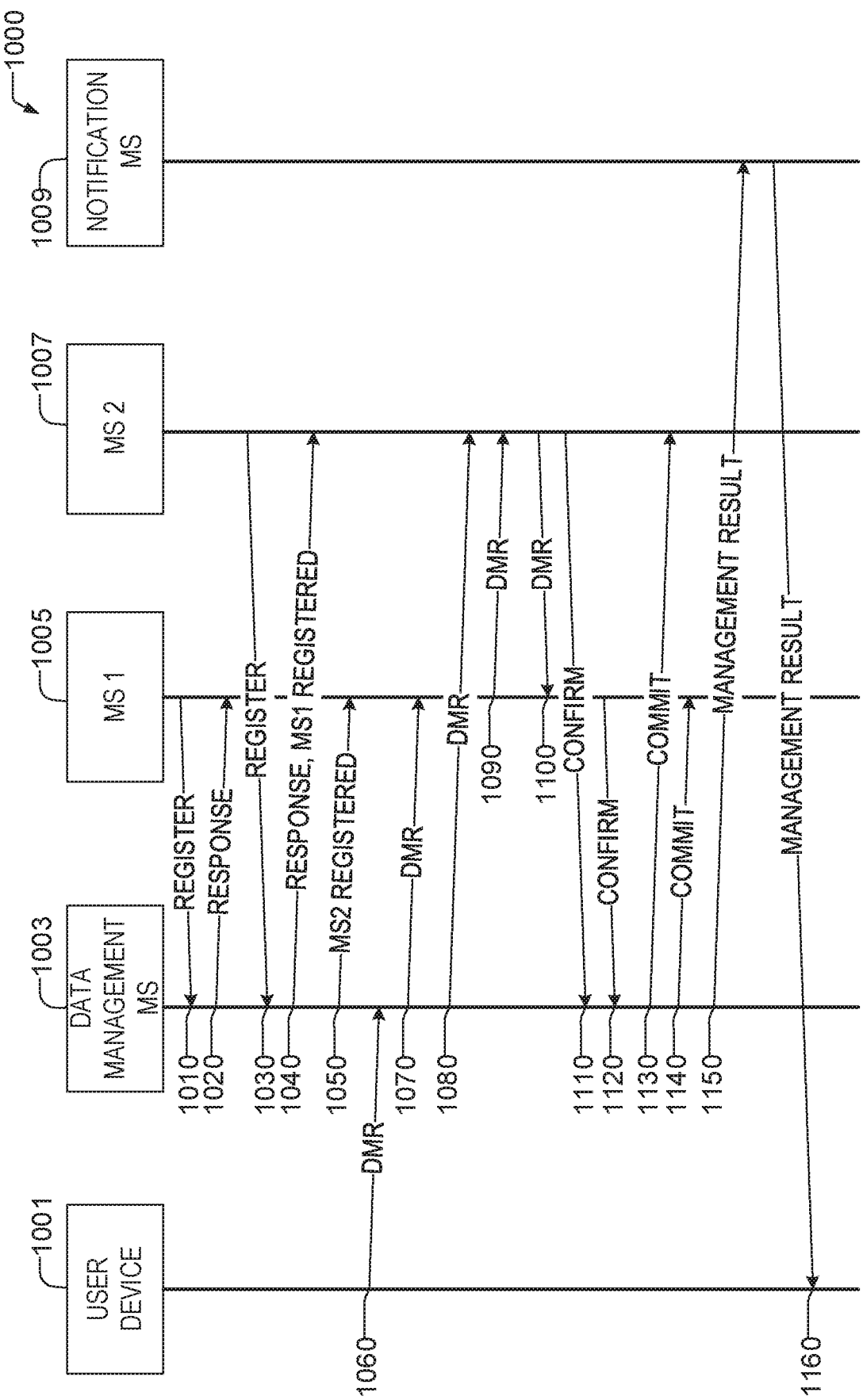
FIG. 1 shows a message sequence chart of managing data in electronic storage devices performed by a first microservice according to some examples of the present disclosure.

Network based services are self-contained, modular, distributed applications that can be located and invoked over a computer network to create larger applications that provide network-based products and services to users. The network based services in some examples utilize open standards such as eXtensible Markup Language (XML) to describe data, Simple Object Access Protocol (SOAP) to exchange data (including the use of lower level protocols such as Transmission Control Protocol and Internet Protocol), and Web Service Definition Language (WSDL) to describe the services.

Microservices are becoming popular for implementing network-based services. Microservices are small, modular services in which each service runs a as a unique process and communicates through well-defined, lightweight mechanisms to serve a goal. Microservices may communicate with each other (e.g., over a network) to form larger, more powerful services. In some examples, microservices may execute on one or more computing devices that are accessible to users and over a computer network. Microservices may be accessible to each other through the computer network or through inter-process communication or the like. Each microservice may be a separate computing process. A group of one or more microservices may collectively provide one or more network based services. Thus microservices may be smaller network based services. These microservices may run on the same computing device (as different processes) or on different devices and may be communicatively coupled through one or more networks.

In contrast to traditional network based services (which are often monolithic web applications) that are difficult to modify, update, and keep fresh, microservices allow for agile deployment, easy testing, easy replacement, the ability to organize services around their capabilities (e.g., user interface features, back-end features, and the like), easy scalability and the like. An example implementation of microservices includes DOCKER® by Docker, Inc, which is an open sourced project that automates the deployment of applications inside software containers.

One problem that arises from the microservice architecture is that data relating to a common subject (e.g., the same user, the same transaction, and the like) is now fragmented across multiple services (e.g., multiple applications) and may be stored in many different electronic storage devices. Managing these multiple locations then becomes problematic. For example, if the user deletes their account, it now becomes difficult to determine which microservices are storing data relating to the user. For example, a first microservice may call a second microservice that may store certain user data. This may lead to situations in which not all of the data of the user may be deleted. This is both wasteful of computer resources, and potentially violates a user's privacy and other rights (e.g., the right to be forgotten in some countries). Likewise, for auditing and other purposes, it may not be certain which data is being stored that relate to the audit request as it is fragmented.

Disclosed in some examples are systems, methods, and machine readable mediums which provide for a data management process (e.g., a data management microservice) which manages data across multiple other processes (e.g., other microservices, other services, or the like) to mitigate the impact of fragmented data. In some examples, the data management microservice may include an erasure service which ensures that all data corresponding to given data characteristic is deleted from microservices (or other services or processes) within a domain. Other example data management operations may include adding data, deleting data (e.g., deleting all data for a user, transaction, product, and the like), moving data (e.g., from one microservice to another), copying data, changing data, searching data, archiving data, or other actions. An example data characteristic may be that the data relates to a particular user, a particular product, a particular transaction, is of a certain size, contains certain content, is of a certain type, or any other uniquely identifying data characteristic.

While the specification describes a data management microservice, one of ordinary skill in the art will understand that this is an exemplary implementation. For example, the data management functions may be performed by a data management network-based service, a data management micro service, or more generally, a data management process. For descriptive convenience, the specification describes various example embodiments in terms of microservices, but as noted, the present disclosure is applicable to network-based services, and processes and applications in general. For example, in FIG. 1, data management ms, ms 1, ms 2, and the notification ms, may be one or more of: microservices, network-based services, or more generally any process communicatively coupled with the data management component.

In some examples, the data management microservice may be domain-specific. A microservice domain is a group of microservices communicatively coupled and operated by a same entity or setup to achieve a same purpose. For example, a first network-based service provider may implement a data management microservice related to their network-based services and a second network-based service provider may implement a data management microservice related to their network-based services. Microservices within a domain register with the data management microservice. The data management microservice then has a domain-wide view of where data is potentially located that may be responsive to a data management request.

In some examples, users or other microservices wishing to manage data across microservices in a domain may do so directly by contacting the data management micro service. For example, a device of the user may contact the data management microservice across a network using one or more communication protocols. A software application on the device of the user may facilitate this process for the user. In other examples, a network-based service provider may provide one or more front-end microservices which provide one or more interfaces to user devices of users. These front-end microservices may receive a request for data management from a user (e.g., input into a user interface) and then forward that request to the data management microservice, which may then handle the request.

The interface to the user devices may be a web-based interface, such as a website or web application. For example, the front end microservices or the data management microservices may provide one or more user interface descriptors (e.g., HyperText Markup Language (HTML), Content Style Sheets, JavaScript, and the like) that when rendered by the user device implement one or more Graphical User Interface displays for managing data in the microservices and allow the user to issue data management commands to the data management microservice. In other examples, this may be a dedicated application, such as a mobile application (e.g., an application available through an application server such as the APPLE APP STORE®).

Microservices in the domain that store data for more than a temporary time (e.g., anything in non-volatile storage) may register with the data management microservice. The data management microservice may be discoverable to other services and processes through one or more discovery techniques including Web Services Dynamic Discovery (WS-Discovery) protocols, advertisement packets (sent to a multicast or broadcast address) or the like.

The data management microservice may then issue data management requests to one or more of the registered microservices specifying an action (e.g., delete, copy, and the like) and data characteristics specifying the data to which the action is to be applied. Upon receiving a data management request, the microservices may then search their data to determine data matching the data characteristics and may reply with a confirmation to the data management microservice. The confirmation may specify if there is any data matching the data characteristics, or the microservices may perform the requested action and pass back the results (depending on the requested action).

For example, for search requests, the confirmation may contain any data matching the data characteristics in the request. Data from the confirmation messages of the various microservices may be aggregated by the data management microservice and returned to the requestor. For other operations, such as deleting, copying, moving, changing, or archiving data, the microservice may search their data for matching data and mark the data such that changes are not made. The confirmation may be a signal that the microservice is ready to perform the action and has matching data. The data management microservice then sends a commit message to signal the participant microservices that they are to perform the action. This prevents the participant microservices from being out of synch should one microservice be temporarily non-responsive.

Should one of the registered microservices not respond to the data management request, the data management microservice may proceed with only the responding microservices by sending a commit, cancel the operation (e.g., with a cancel message or by failing to send a commit message), or retry the microservices that did not respond (e.g., for a certain number of retries). This may depend upon a domain policy (set by a domain administrator) or a user preference.

Additional verifications that all participant microservices have committed the action may be made (e.g., additional requests may be made to verify that all services reply that no data matches the characteristics, or additional commit messages). If some microservices did not properly perform the requested action, the data management microservice may retry the action (e.g., either the commit, or the request as well).

Participant microservices are the set of one or more microservices that are participants in the data management request. Participant microservices may be processes on the same computing device or processes on different computing devices. The microservices that are participants may depend on the requested action. For example, copying, moving, or adding data may involve a specified source and for some examples, a specified destination microservice that is specified in the data management request. For other actions (such as delete actions and search actions) the data management request is sent to all microservices. In these examples, while the data management request is sent to all microservices, commit messages may only be sent to microservices that indicate that they have matching data in their action confirmation messages.

Turning now to FIG. 1, a message sequence chart of managing data in electronic storage devices performed by a first microservice is shown according to some examples of the present disclosure. Shown is a user device 1001 operated by a user, a data management microservice 1003, a microservice 1 ("ms 1") 1005, a microservice 2 ("ms 2") 1007, and a notification microservice 1009. One or more of the components shown in FIG. 1 may be on the same computing device or may be on different computing devices. Components shown in FIG. 1, may be communicatively coupled over a network (and thus the messaging shown in FIG. 1 occurs over a network), or may be communicatively coupled using other technologies (such as inter or intra-process communication). Components 1003, 1005, 1007, and 1009 may be part of a microservice domain. A microservice domain is a group of microservices communicatively coupled and operated by a same entity or setup to achieve a same purpose.

Ms1 1005 and ms2 1007 each register with the data management microservice 1003. This occurs with registration messages 1010 and 1030 and registration response messages 1020 and 1040. In some examples, registration may be microservice specific. That is, each microservice may register itself with the data management microservice 1003. For example, upon startup of the microservices, one step is to register with the data management microservice 1003. The data management microservice 1003 then records microservices that register with it and details on how to contact the microservices (e.g., methods of contact—network or intra or inter process communication and any needed addresses or protocols). Details of the microservice may be provided in the registration, including details on how to contact the microservice, and the like.

The data management microservice 1003 then replies to the registered microservice confirming registration and informing the registered microservice of the existing registered microservices. For example, at message 1040 the data management microservice 1003 informs ms2 1007 that ms1 1005 is also registered. Likewise, all existing microservices are notified when a new microservice registers. For example, message 1050 informs ms1 1005 (which was already registered) about the recent registration of ms2 1007.

The microservices may determine contact information for the data management microservice 1003 that is used to register with the data management microservice 1003 in a variety of ways. For example, data management microservice 1003 may broadcast packets (e.g., to a broadcast Internet Protocol (IP) address) to all microservices in the domain containing contact information. In other examples, data management microservice 1003 may register contact information in a service registry maintained by the domain that all microservices in the domain know about. In some examples, the data management microservice 1003 may implement a Web Services Dynamic Discovery (WS-Discovery) protocol.

User device 1001 may send a data management request 1060 (DMR) to the data management microservice 1003. The data management request 1060 may specify an operation (such as add, delete, move, copy, change data, search data, archive data, and the like) and data characteristics of the data on which the operation is to be performed. For some actions, the DMR 1060 may specify a source and destination microservice. In other examples, for some actions (e.g., delete, search, and other actions), all registered microservices are participant microservices. In the example of FIG. 1, the data management microservice sends the DMR to all registered micro services. The data management microservice 1003 sends a DMR 1070 to the ms1 1005 and a DMR 1080 to the ms2 1007 (and all services registered with the data management microservice 1003). The microservices may then forward this message on to other microservices for redundancy. In some examples, to provide for recognition of duplicate management messages, the data management microservice 1003 may add a transaction identifier to the DMR so that microservices receiving multiple DMRs may determine an order (e.g., a lower transaction number is to be executed first) and to determine which are duplicate messages (e.g., based upon identical transaction numbers). In FIG. 1, MS1 1005 forwards the DMR 1090 to MS2 1007. In some examples, since MS2 1007 already received the DMR from both MS1 1005 and data management microservice 1003, ms2 1007 may forgo sending the DMR to ms1 1005. In other examples, ms2 1007 proceeds to forward the DMR 1100 to ms1 1005 anyway (e.g., to allow for simpler implementations of micro services).

The microservices then search the data under their control for data matching the given data characteristics in the DMRs. The microservices then confirm the receipt of the data management request using confirmation messages 1110 and 1120. In some examples, for some actions (e.g., search actions) the confirmation messages may contain data (or a list of data) which matches the data characteristics from the DMR. In the case of other operations, the confirmation may indicate whether any data matched the characteristics (and in some examples, a copy of the data). In some examples, where the action is an action that is not executed immediately, the microservices may then mark this data as to prevent any changes to the data before the commit message.

Once the data management microservice 1003 receives confirmations from the participant microservices, the data management microservice 1003 may send a commit message to the participant micro services. These messages, 1130 and 1140 instruct the microservices to actually perform the given action, e.g., to delete the data matching the data characteristics in their data stores. Furthermore, while not shown in FIG. 1, as with the DMRs (1060-1100), each microservice may forward the commit to one or more of the other participant micro services.

Once the data management microservice 1003 is satisfied that the management operation was committed, it may send a management result 1150 to a notification microservice 1009 which may notify the user device 1001 using notification 1160. Data management microservice 1003 may be satisfied that the management operation was committed when it sends the commit messages to the participant micro services, or it may receive a reply (not shown in FIG. 1) from each microservice indicating the action is completed. In other examples, for certain actions the data management microservice 1003 may send another DMR 1070 to participant microservices and confirm that the data conforms to an expected result of the action (e.g., for a delete, that no data results are returned matching the data characteristics).

Figure 2:
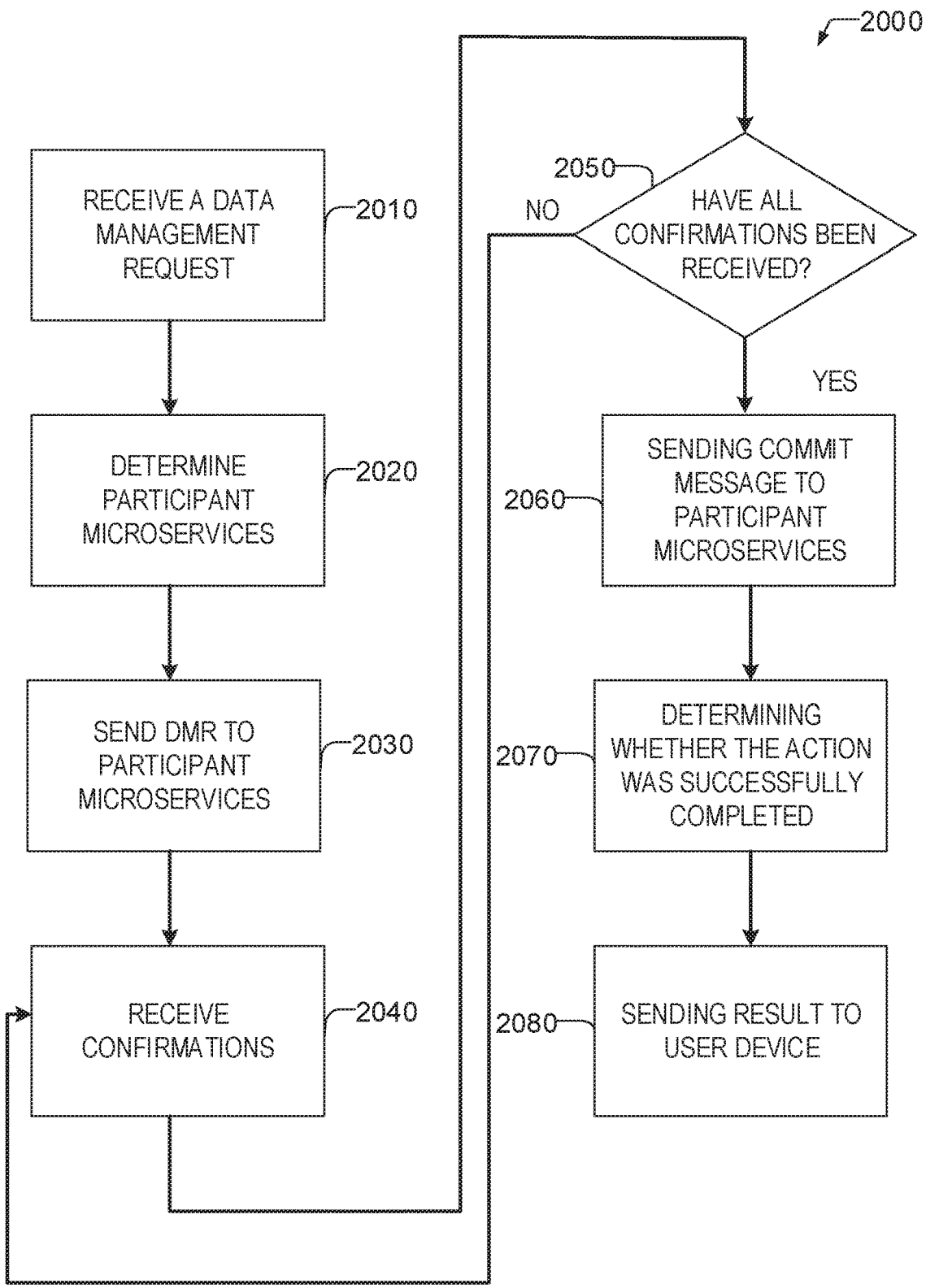
FIG. 2 shows a flowchart of a method of a data management microservice handling a data management request according to some examples of the present disclosure.

Turning now to FIG. 2 a flowchart of a method 2000 of a data management microservice handling a data management request is shown according to some examples of the present disclosure. At operation 2010 the data management microservice receives a data management request. The request may be to delete data, copy data, move data, and the like. The request may be a generic request message with an indication in the request of what type of action to perform on the data (e.g., delete, copy, move) or in other examples, each message may be different dependent on the desired action. The request may include data characteristics (e.g., criteria) which describe the data the request is to apply to. Data characteristics may include size, type, contents, subject, and the like. For example, the subject of data may describe the individual the data is associated with. The DMR message may include one or more participant microservices (depending on the desired action). The request may be received from a user directly or from another micro service.

At operation 2020 the data management microservice may determine a set of one or more participant microservices that the request applies to. In some examples, the set of one or more microservices may be the participant microservices specified in the DMR. In other examples, the participant microservices may be one, some, or all microservices that have registered with the data management microservice. At operation 2030 the data management microservice may send a management message to the participant microservices. The participant microservices may then forward that message to all other participant microservices that those microservices are aware of. In some examples, the list of participant microservices may be added to the DMR by the data management microservice. Forwarding in this manner may introduce redundancy to ensure that the data management request is properly delivered.

At operation 2040 the data management microservice may receive confirmations from the set of one or more participant micro services. At operation 2050 a check may be made to determine if all of the participant microservices have replied affirmatively. If not, the data management microservice may continue waiting at operation 2040. The data management microservice may set a timer at operation 2030 to a predetermined timeout value and if the timeout value expires prior to receiving all responses from the participant microservices, the data management microservice may send a failure message to the requestor. This is not shown in FIG. 2 for clarity purposes. Additionally, when responses are received, in some examples, they may have status codes indicating success or failure. If the status code of any response is a failure, in some examples, the data management microservice proceeds with the data management action, in other examples, it fails the data management action (by sending a cancel message to participating microservices that responded or by not sending anything and causing the microservices to timeout on the operation), in still other examples, it may retry those microservices that have failed.

As already stated, for some examples, some data management actions such as a search, it may be appropriate for the microservices to immediately execute the action. In these examples, the confirmation may have a status indicating the proposed action has been completed. In some examples, where the action requests information (e.g., a search) the confirmation may have the requested information (e.g., a list of, or a copy of the data matching the data characteristics). At this stage, processing may terminate. For some actions, such as delete actions, the data management microservice will need to ensure that microservices do not have inconsistent copies of data due to some microservices executing the action and others not executing the action. To do this, a commit message may be sent once all confirmation messages are received.

At operation 2060, once all confirmations have been received (and indicate success), the data management microservice may send a commit to the participant microservices. This commit message instructs the participant microservices to perform the requested action on the data. For example, if the requested action is a delete action, the commit instruction instructs the microservices to delete the data matching the data characteristics. In some examples, where some participant microservices indicated with their confirmation message that they do not have matching data, these microservices may not be sent a commit message at operation 2060.

At operation 2070 the data management microservice determines whether the action was successfully completed. In some examples, for actions that do not feature a commit message, this determination is based upon one or more status codes in responses from the micro services. For example, status codes in confirmations received at operation 2040. In other examples, once the commit message is sent to the participant microservices, the success of the action may be assumed. In yet other examples, the data management microservice may receive confirmations of the commit operations. In still yet additional examples, the data management microservice may send a query to the set of recipient microservices and the data management microservice may determine from those responses whether the action was completed successfully.

At operation 2080 the results of the action are sent to the user device. In some examples, the data management microservice may directly send the result, in other examples, the result may be sent to a notification service. In some examples, communications between the user device, the data management microservice, and the microservices may utilize network-based communication protocols such as Simple Object Access Protocol (SOAP), MQ Telemetry Transport (MQTT), HyperText Protocol (HTTP), GOOGLE® Cloud Messaging (GCM), APPLE PUSH NOTIFICATION (APN), or the like. For example, microservices may implement one or more SOAP, XML, and WSDL protocols for communicating and exchanging data. In other examples, the communications may utilize inter-process or intra-process communications.

Figure 3:
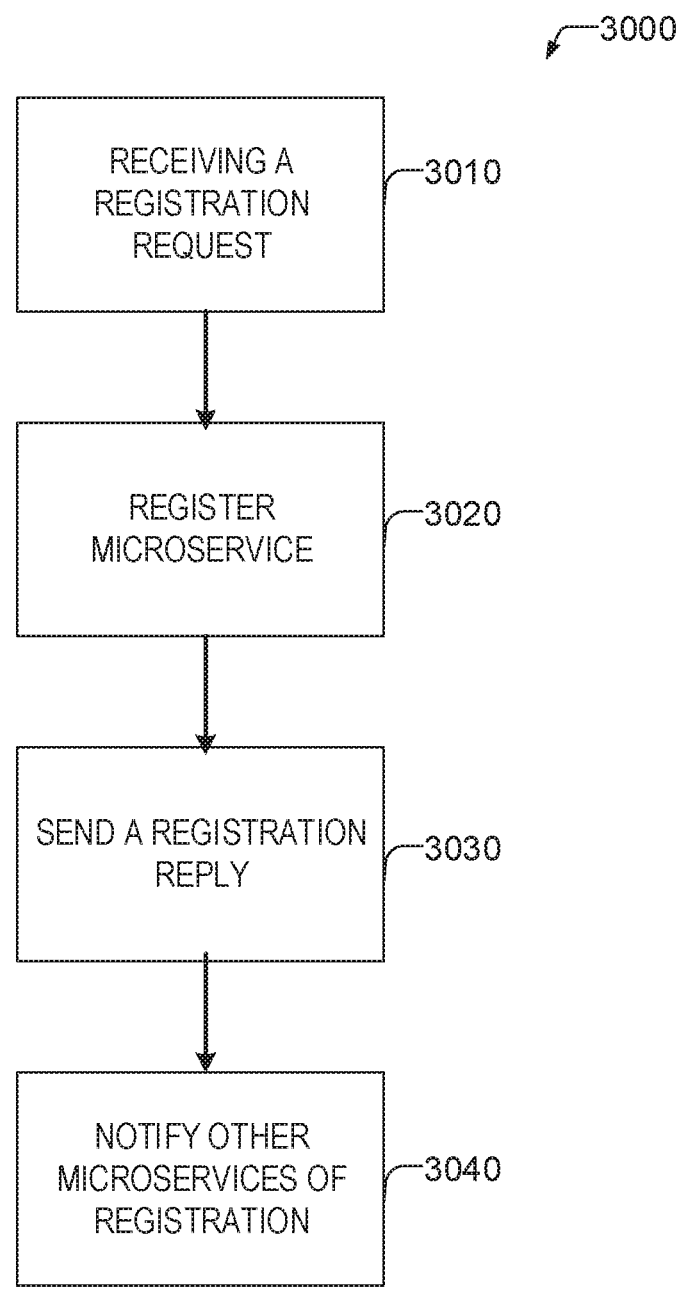
FIG. 3 shows a flowchart of a method of a data management microservice registering a microservice according to some examples of the present disclosure.

Turning now to FIG. 3, a flowchart of a method of a data management microservice registering a microservice 3000 is shown according to some examples of the present disclosure. This method may be performed when the data management microservice receives a registration request from a microservice. At operation 3010 the data management microservice receives a registration request from a microservice. At operation 3020 the data management microservice registers the microservice in its database of registered microservices. For example, the data management microservice may fill out a data structure including information on the micro service, including details on how to contact the microservice and adds the data structure to a list of other registered microservices stored in a storage device of the data management micro service. In some examples, the participant set of one or more microservices comprises one, one or more, or all of the microservices in the list of registered micro services. At operation 3030 the data management microservice may send a reply message indicating success or failure of the microservice to register with the data management microservice. At operation 3040, in some examples, one, one or more, or all of the microservices in the list of registered microservices (in some examples, except the newly registered microservice) may be notified of the registration of a new microservice.

Figure 4:
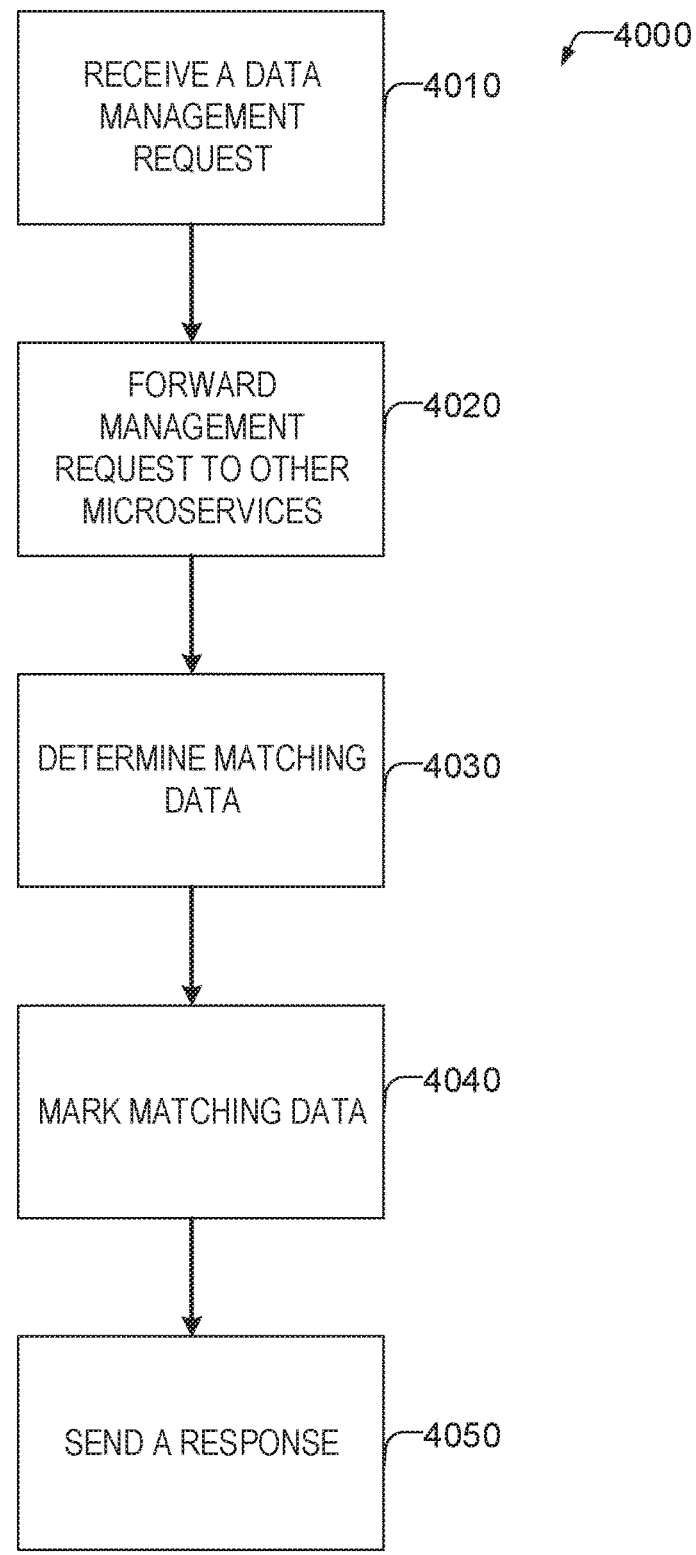
FIG. 4 shows a flowchart of a method of a microservice handling a data management request according to some examples of the present disclosure.

Turning now to FIG. 4, a flowchart of a method of a microservice handling a data management request is shown according to some examples of the present disclosure. At operation 4010 the microservice receives the data management request. At operation 4020, the microservice forwards the data management request to other micro services. For example, the microservice may forward the data management request to one, one or more, or all of the participant microservices that it is aware of through the notification messages of the data management microservice (e.g., operation 3040 of FIG. 3). At operation 4030 data matching the data characteristics in the data management request is located. For example, the data in a data storage device may be searched, or data in a random access memory (RAM) may be searched (e.g., one or more in-memory data structures).

In some examples, the data may be matched based upon one or more of: contents of the data, metadata specifying information about the data (e.g., which user the data relates to, which product the data relates to, and the like), size, of the data, and the like. If no data is located, the microservice may skip to operation 4050 and immediately send a response (in some examples indicating that no data was found matching the data characteristics in the DMR).

If the data management request can be satisfied immediately, the action is performed on the data and an appropriate response may be generated indicating whether the action succeeded or failed, and in some examples providing the data. At operation 4040 for data actions that cannot be completed at this time (e.g., a commit command is desired first from the data management microservice), the data may be marked to prevent alteration. At operation 4050 the confirmation is sent to the data management microservice.

Figure 5:
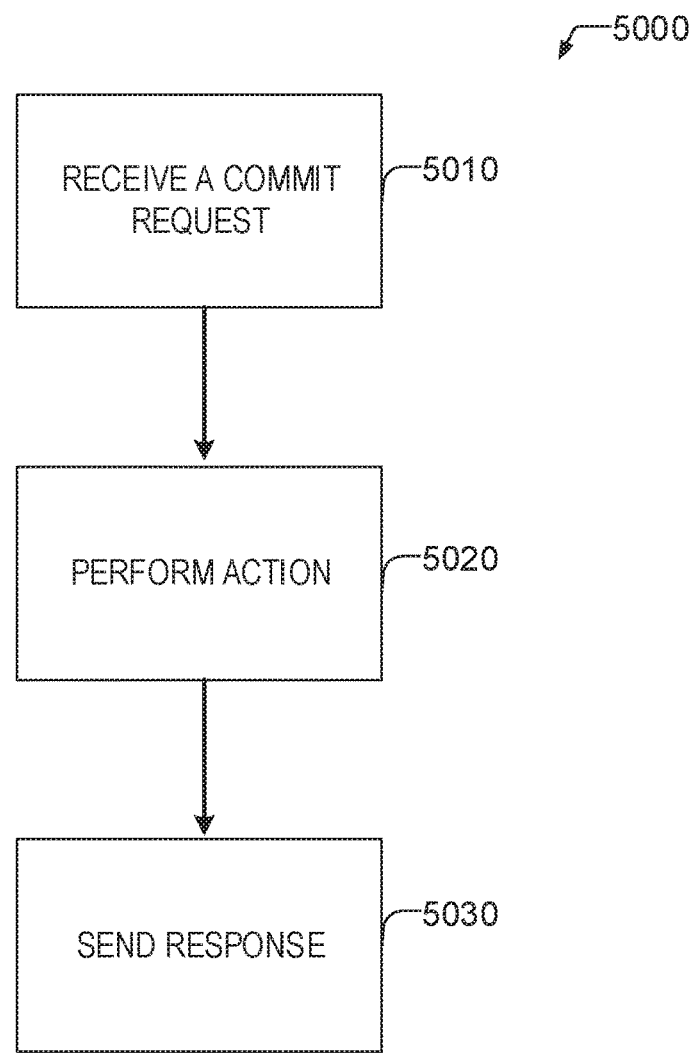
FIG. 5 shows a flowchart of a method of completing certain actions according to some examples of the present disclosure.

Turning now to FIG. 5 a flowchart of a method of completing certain actions 5000 is shown according to some examples of the present disclosure. For certain data management actions, the microservice may need to receive a commit message prior to performing the action. This may ensure that all the microservices either commit the action or none of the microservices commit the action. For example, in the case of a delete data action, the microservices may mark the data (e.g., at operation 4040 of FIG. 4). At operation 5010 the commit command may be received. A commit command may contain the same transaction identification as the DMR message that it is committing so the microservices can determine which of possibly several DMR actions to commit. At operation 5020 the action may be performed, and in some examples, at operation 5030 a status may be returned.

In some examples, prior to a commit action being performed, the data management microservice may "undo" the previous deletion. For example, if the data management microservice failed to receive confirmations from all the microservices, the data management microservice may send a cancel command to the microservices to cancel the action. If a cancel command is received, the data is "unmarked" and may be modified again. In some examples, without a commit or cancel from the data management microservice, the microservices may unmarked the data themselves (e.g., at the expiry of a timer) or perform the action. Whether the microservices unmark the data or perform the action may be determined by a domain-based policy setting previously communicated to the microservices. This domain-based policy may be set by a user (e.g., the end user), a domain administrator, a device manufacturer, or the like through one or more user interfaces.

Figure 6:
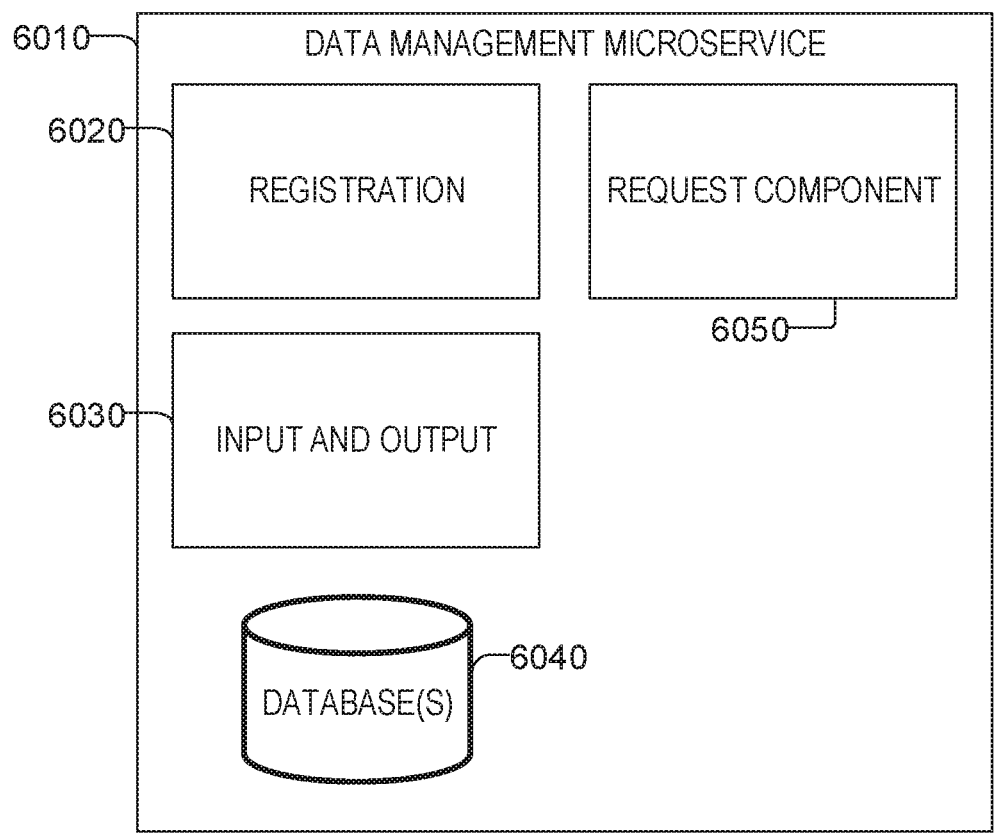
FIG. 6 shows a schematic of a data management microservice according to some examples of the present disclosure.

Turning now to FIG. 6, a schematic of a data management microservice 6010 is shown according to some examples of the present disclosure. Input and output module 6030 may implement one or more network-based communication protocols (as previously described) to communicate with user devices and one or more microservices. Registration module 6020 may work with input and output module 6030 to receive and process registrations from microservices, send out notifications when new microservices are registered and in some examples, register the data management microservice with a service registry of a domain or otherwise advertise the data management microservice to microservices (e.g., through broadcasting advertisement packets). Registration module 6020 may store information on one or more microservices that have registered (e.g., contact information such as a network address (e.g., an Internet Protocol—IP—address)) in the database 6040. Registration module may, for example, implement the methods of FIG. 3.

Request component 6050 may receive data management requests from user devices or from other microservices (e.g., front end microservices) and process them according to the desired action. For example, the request component may implement the methods described in FIG. 2. Database 6040 may store registration information about micro services, transaction information for storing states of one or more ongoing data management actions, and the like.

Figure 7:
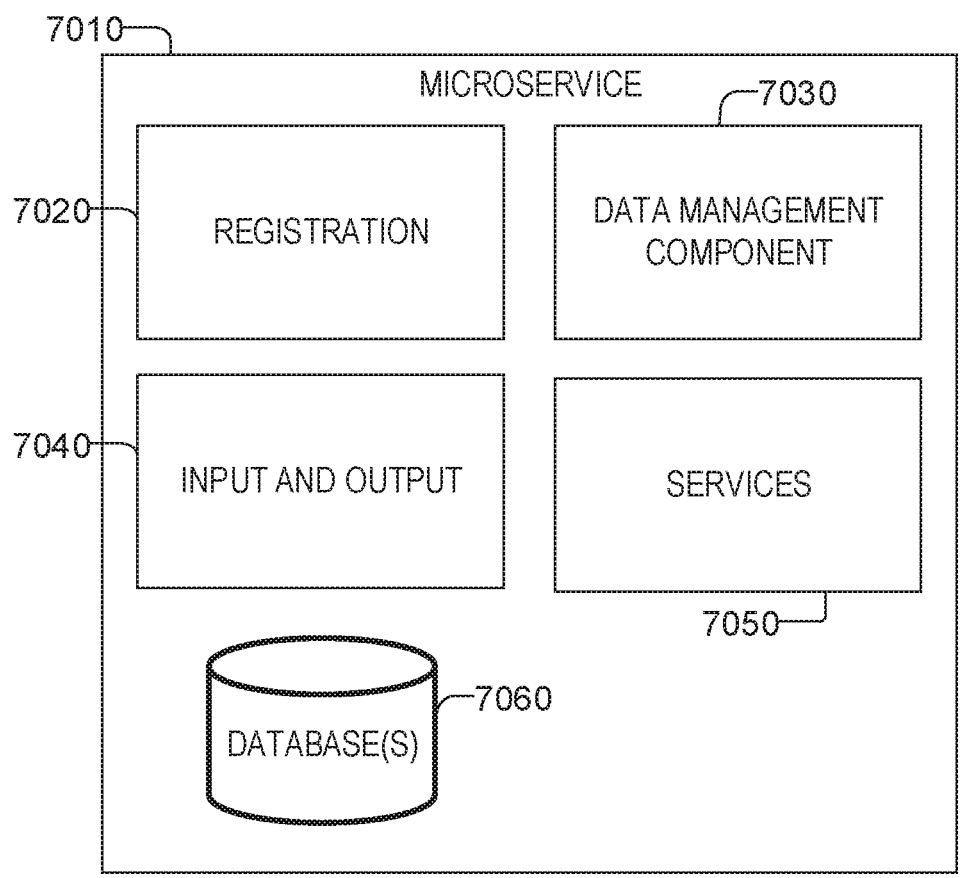
FIG. 7 shows a schematic of a microservice according to some examples of the present disclosure.

Turning now to FIG. 7, a schematic of a microservice 7010 is shown according to some examples of the present disclosure. Input and output module 7040 may implement one or more network-based communication protocols (as previously described) to communicate with user devices, one or more microservices, and the data management microservice. Registration module 7020 may register with the data management microservice and may receive notifications that other microservices are registered with the data management microservice via the input and output module 7040. Information about the data management microservice such as its address, the microservice's registration state, and information (such as a network address) of other microservices may be stored in the database 7060.

Data management component 7030 may receive (via the input and output module 7040) one or more data management requests. Data management requests may include a desired action, such as adding data, delete data, move data, copy data, change data, search data, archive data, or other actions. Data management requests may also include data characteristics to indicate which data held by microservice 7010 (e.g., data stored in database 7060 or other data to which the microservice 7010 has custody over) the action applies to. For example, a user identifier of the user that is requesting the action (e.g., the user is requesting the action to be performed on all data corresponding to that user identifier). Data management component 7030 may implement the methods of FIGS. 4 and 5 in some examples.

Services 7050 provides the actual services of the microservice. Example services include a user profile service, a product registration service, an order management service, customer management service, a backend process, a front-end process, a logins service, an Application Programming Interface (API) service, an email service, a push notification service, a data storage service, a shipments service, an orders service, and the like. Services 7050 may be the function of the microservice —i.e., the functionality which it provides through an Application Programming Interface to other services, users, processs, and the like.

While in the preceding description, a data relating to a single user was managed, other more complicated scenarios may be utilized in which multiple user's data may be managed simultaneously. For example, microservices may store characteristics of users along with the user's data. Rather than having an identifier of a single user, the data management request may have a group identifier, or other user characteristic criteria. The data management request may also have data characteristic criteria specifying which data from matching user characteristic criteria the action is to be applied to. The microservices may, upon receipt of a data management request, apply various actions to all data matching the data characteristic criteria that corresponds to all users that match the user characteristic criteria.

Figure 8:
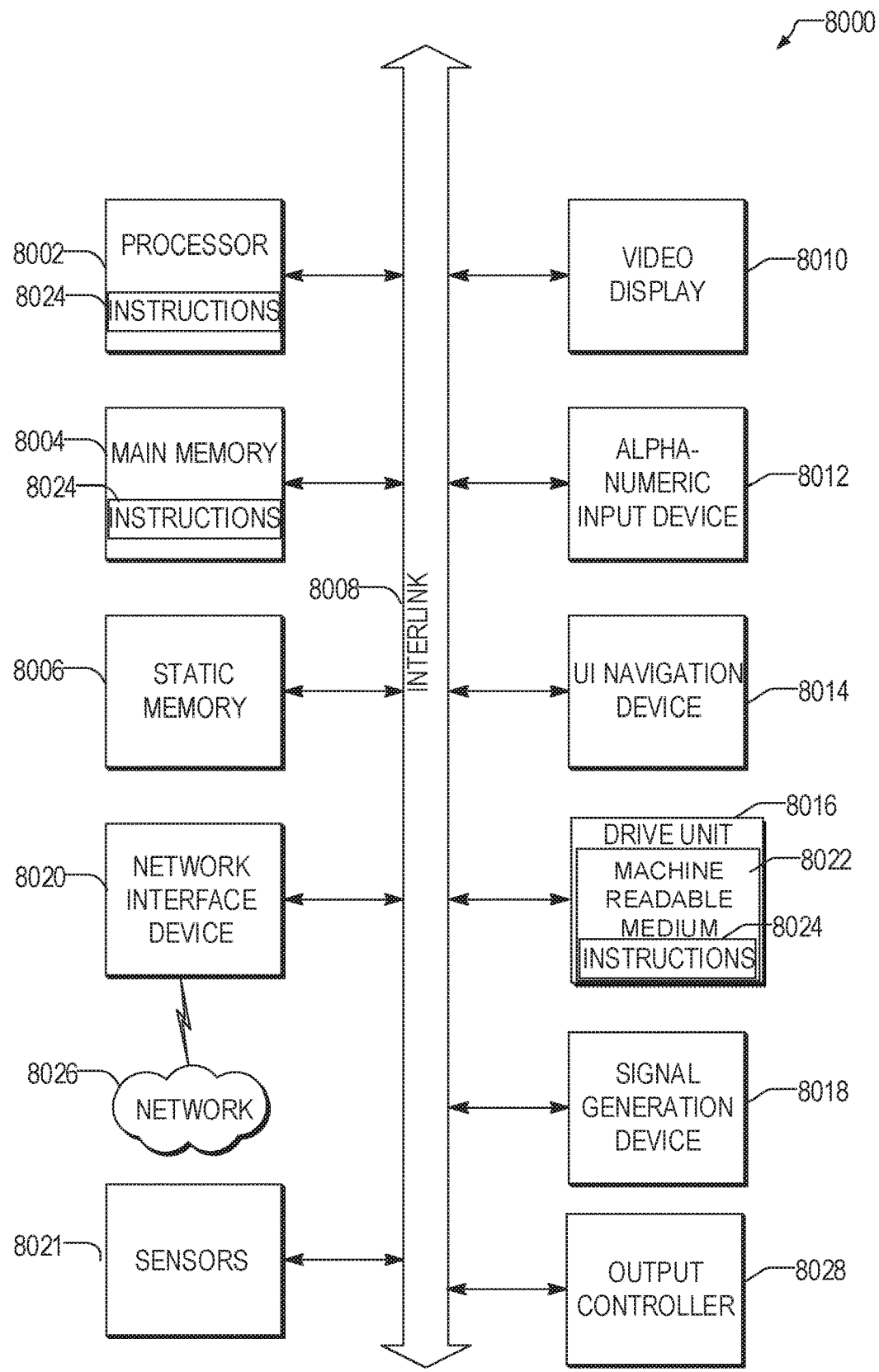
FIG. 8 is a block diagram illustrating an example of a machine upon which one or more embodiments may be implemented according to some examples of the present disclosure.

FIG. 8 illustrates a block diagram of an example machine 8000 upon which any one or more of the techniques (e.g., methodologies) discussed herein may perform. In some examples, machine 8000 may be configured to include the modules of FIGS. 6 and 7. In alternative embodiments, the machine 8000 may operate as a standalone device or may be connected (e.g., networked) to other machines. In a networked deployment, the machine 8000 may operate in the capacity of a server machine, a client machine, or both in server-client network environments. In an example, the machine 8000 may act as a peer machine in peer-to-peer (P2P) (or other distributed) network environment. The machine 8000 may be a personal computer (PC), a tablet PC, a set-top box (STB), a personal digital assistant (PDA), a mobile telephone, a smart phone, a web appliance, a network router, switch or bridge, a server, or any machine capable of executing instructions (sequential or otherwise) that specify actions to be taken by that machine. The machine 8000 may execute a data management micro service or one or more microservices. In other examples, the machine may be a user device. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module (also described herein as a process) that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 8000 may include a hardware processor 8002 (e.g., a central processing unit (CPU), a graphics processing unit (GPU), a hardware processor core, or any combination thereof), a main memory 8004 and a static memory 8006, some or all of which may communicate with each other via an interlink (e.g., bus) 8008. The machine 8000 may further include a display unit 8010, an alphanumeric input device 8012 (e.g., a keyboard), and a user interface (UI) navigation device 8014 (e.g., a mouse). In an example, the display unit 8010, input device 8012 and UI navigation device 8014 may be a touch screen display. The machine 8000 may additionally include a storage device (e.g., drive unit) 8016, a signal generation device 8018 (e.g., a speaker), a network interface device 8020, and one or more sensors 8021, such as a global positioning system (GPS) sensor, compass, accelerometer, or other sensor. The machine 8000 may include an output controller 8028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 8016 may include a machine readable medium 8022 on which is stored one or more sets of data structures or instructions 8024 (e.g., software) embodying or utilized by any one or more of the techniques or functions described herein. The instructions 8024 may also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 may constitute machine readable media.

While the machine readable medium 8022 is illustrated as a single medium, the term "machine readable medium" may include a single medium or multiple media (e.g., a centralized or distributed database, and/or associated caches and servers) configured to store the one or more instructions 8024.

The term "machine readable medium" may include any medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 8024 may further be transmitted or received over a communications network 8026 using a transmission medium via the network interface device 8020. The Machine 8000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 8020 may include one or more physical jacks (e.g., Ethernet, coaxial, or phone jacks) or one or more antennas to connect to the communications network 8026. In an example, the network interface device 8020 may include a plurality of antennas to wirelessly communicate using at least one of single-input multiple-output (SIMO), multiple-input multiple-output (MIMO), or multiple-input single-output (MISO) techniques. In some examples, the network interface device 8020 may wirelessly communicate using Multiple User MIMO techniques.

OTHER NOTES AND EXAMPLES

Example 1 is a method of deleting data in electronic storage devices, the method performed by a data management process executed by at least one processor, the method comprising: using the at least one processor: receiving, over a network from a user device, a data management request requesting that data corresponding to a user be deleted; determining from registration data, a set of one or more participant processes; sending the data management request to the participant processes; receiving confirmation messages from each of the one or more participant processes, and in response to receiving a final confirmation message, sending a commit message to one or more of the participant processes to instruct the participant processes to delete any data corresponding to the user; and sending a notification to the user device that the request is complete.

In Example 2, the subject matter of Example 1 optionally includes wherein determining from registration data, the set of one or more participant processes comprises selecting all processes that have registered with the data management process.

In Example 3, the subject matter of any one or more of Examples 1-2 optionally include wherein sending the commit message to one or more of the participant processes comprises sending commit messages to ones of the participant processes that indicated in their respective confirmation messages that they have data corresponding to the user.

In Example 4, the subject matter of any one or more of Examples 1-3 optionally include wherein the notification is sent to a notification process.

In Example 5, the subject matter of any one or more of Examples 1-4 optionally include wherein the notification is a push notification.

In Example 6, the subject matter of any one or more of Examples 1-5 optionally include sending advertisement packets from the data management process to other processes in a domain to solicit registrations.

In Example 7, the subject matter of any one or more of Examples 1-6 optionally include wherein the data management process is executing on a same processor of the at least one processor as at least one process of the set of participant processes.

In Example 8, the subject matter of any one or more of Examples 1-7 optionally include wherein the data management process is executing on a different processor of the at least one processor as at least one process of the set of participant processes.

In Example 9, the subject matter of any one or more of Examples 1-8 optionally include wherein the data management process is a network based service.

In Example 10, the subject matter of any one or more of Examples 1-9 optionally include wherein the data management process is a microservice.

Example 11 is at least one machine-readable medium comprising instructions, which when performed by a machine, causes the machine to perform operations of any one of Examples 1-10.

Example 12 is a device comprising means for performing the operations of any one of Examples 1-10.

Example 13 is a system for deleting data in electronic storage devices comprising: a processor; a memory, the memory communicatively coupled to the processor and comprising instructions, which when performed by the processor, cause the processor to perform a data management process, the data management process to cause the processor to perform operations comprising: receiving, over a network from a user device, a data management request requesting that data corresponding to a user be deleted; determining from registration data, a set of one or more participant processes; sending the data management request to the participant processes; receiving confirmation messages from each of the one or more participant processes, and in response to receiving a final confirmation message, sending a commit message to one or more of the participant processes to instruct the participant processes to delete any data corresponding to the user; and sending a notification to the user device that the request is complete.

In Example 14, the subject matter of Example 13 optionally includes wherein the operations of determining from registration data, the set of one or more participant processes comprises the operations of selecting all processes that have registered with the data management process.

In Example 15, the subject matter of any one or more of Examples 13-14 optionally include wherein the operations of sending the commit message to one or more of the participant processes comprises the operations of sending commit messages to ones of the participant processes that indicated in their respective confirmation messages that they have data corresponding to the user.

In Example 16, the subject matter of any one or more of Examples 13-15 optionally include wherein the notification is sent to a notification process.

In Example 17, the subject matter of any one or more of Examples 13-16 optionally include wherein the notification is a push notification.

In Example 18, the subject matter of any one or more of Examples 13-17 optionally include wherein the operations comprise: sending advertisement packets from the data management process to other processes in a domain to solicit registrations.

In Example 19, the subject matter of any one or more of Examples 13-18 optionally include wherein at least one process of the set of participant processes is also executing on the processor.

In Example 20, the subject matter of any one or more of Examples 13-19 optionally include wherein the data management process is a network based service.

In Example 21, the subject matter of any one or more of Examples 13-20 optionally include wherein the data management process is a microservice.

Example 22 is at least one machine-readable medium for deleting data in electronic storage devices, the machine-readable medium including instructions, which when performed by a machine causes the machine to execute a data management process that performs operations comprising: receiving, over a network from a user device, a data management request requesting that data corresponding to a user be deleted; determining from registration data, a set of one or more participant processes; sending the data management request to the participant processes; receiving confirmation messages from each of the one or more participant processes, and in response to receiving a final confirmation message, sending a commit message to one or more of the participant processes to instruct the participant processes to delete any data corresponding to the user; and sending a notification to the user device that the request is complete.

In Example 23, the subject matter of Example 22 optionally includes wherein the operations of determining from registration data, the set of one or more participant processes comprises the operations of selecting all processes that have registered with the data management process.

In Example 24, the subject matter of any one or more of Examples 22-23 optionally include wherein the operations of sending the commit message to one or more of the participant processes comprises the operations of sending commit messages to ones of the participant processes that indicated in their respective confirmation messages that they have data corresponding to the user.

In Example 25, the subject matter of any one or more of Examples 22-24 optionally include wherein the notification is sent to a notification process.

In Example 26, the subject matter of any one or more of Examples 22-25 optionally include wherein the notification is a push notification.

In Example 27, the subject matter of any one or more of Examples 22-26 optionally include wherein the operations comprise: sending advertisement packets from the data management process to other processes in a domain to solicit registrations.

In Example 28, the subject matter of any one or more of Examples 22-27 optionally include wherein at least one process of the set of participant processes is executed by the machine.

In Example 29, the subject matter of any one or more of Examples 22-28 optionally include wherein the data management process is a network based service.

In Example 30, the subject matter of any one or more of Examples 22-29 optionally include wherein the data management process is a microservice.

Example 31 is a device for deleting data in electronic storage devices, the device performed by a data management process executed by at least one processor, the device comprising: means for receiving, over a network from a user device, a data management request requesting that data corresponding to a user be deleted; means for determining from registration data, a set of one or more participant processes; means for sending the data management request to the participant processes; means for receiving confirmation messages from each of the one or more participant processes, and in response to receiving a final confirmation message, means for sending a commit message to one or more of the participant processes to instruct the participant processes to delete any data corresponding to the user; and means for sending a notification to the user device that the request is complete.

In Example 32, the subject matter of Example 31 optionally includes wherein means for determining from registration data, the set of one or more participant processes comprises means for selecting all processes that have registered with the data management process.

In Example 33, the subject matter of any one or more of Examples 31-32 optionally include wherein means for sending the commit message to one or more of the participant processes comprises means for sending commit messages to ones of the participant processes that indicated in their respective confirmation messages that they have data corresponding to the user.

In Example 34, the subject matter of any one or more of Examples 31-33 optionally include wherein the notification is sent to a notification process.

In Example 35, the subject matter of any one or more of Examples 31-34 optionally include wherein the notification is a push notification.

In Example 36, the subject matter of any one or more of Examples 31-35 optionally include means for sending advertisement packets from the data management process to other processes in a domain to solicit registrations.

In Example 37, the subject matter of any one or more of Examples 31-36 optionally include wherein the data management process is executing on a same processor of the at least one processor as at least one process of the set of participant processes.

In Example 38, the subject matter of any one or more of Examples 31-37 optionally include wherein the data management process is executing on a different processor of the at least one processor as at least one process of the set of participant processes.

In Example 39, the subject matter of any one or more of Examples 31-38 optionally include wherein the data management process is a network based service.

In Example 40, the subject matter of any one or more of Examples 31-39 optionally include wherein the data management process is a microservice.

Example 41 is a method of deleting data in electronic storage devices, the method performed by a process executed by one or more processors, the method comprising: receiving, over a network from a data management process, a data management request requesting that data corresponding to a user be deleted; forwarding the data management request to a plurality of other processes; determining data corresponding to the user, and marking the data to prevent modifications to the data; sending a confirmation message to the data management process; receiving a commit request; and responsive to the commit request, deleting the data.

In Example 42, the subject matter of Example 41 optionally includes registering with the data management process.

In Example 43, the subject matter of Example 42 optionally includes wherein registering with the data management process comprises determining a network address of the data management process from broadcast messages received from the data management process.

In Example 44, the subject matter of any one or more of Examples 41-43 optionally include wherein the data management request includes a list of two or more participant processes, and wherein forwarding the data management request to the plurality of other processes comprises forwarding the data management request to the two or more participant processes.

In Example 45, the subject matter of any one or more of Examples 41-44 optionally include wherein determining data corresponding to the user comprises searching metadata for data corresponding to the user.

In Example 46, the subject matter of any one or more of Examples 41-45 optionally include wherein the confirmation message includes a status code indicating that data was found corresponding to the user.

In Example 47, the subject matter of any one or more of Examples 41-46 optionally include wherein the process is a network based service.

In Example 48, the subject matter of any one or more of Examples 41-47 optionally include wherein the process is a microservice.

Example 49 is at least one machine-readable medium comprising instructions, which when performed by a machine, causes the machine to perform operations of any one of Examples 41-48.

Example 50 is a device comprising means for performing the operations of any one of Examples 41-48.

Example 51 is a system for deleting data in electronic storage devices, the system comprising: a processor; a memory, the memory communicatively coupled to the processor and comprising instructions, which when performed by the processor, causing the processor to perform operations comprising: receiving, over a network from a data management process, a data management request requesting that data corresponding to a user be deleted; forwarding the data management request to a plurality of other processes; determining data corresponding to the user, and marking the data to prevent modifications to the data; sending a confirmation message to the data management process; receiving a commit request; and responsive to the commit request, deleting the data.

In Example 52, the subject matter of Example 51 optionally includes registering with the data management process.

In Example 53, the subject matter of Example 52 optionally includes wherein registering with the data management process comprises determining a network address of the data management process from broadcast messages received from the data management process.

In Example 54, the subject matter of any one or more of Examples 51-53 optionally include wherein the data management request includes a list of two or more participant processes, and wherein forwarding the data management request to the plurality of other processes comprises forwarding the data management request to the two or more participant processes.

In Example 55, the subject matter of any one or more of Examples 51-54 optionally include wherein determining data corresponding to the user comprises searching metadata for data corresponding to the user.

In Example 56, the subject matter of any one or more of Examples 51-55 optionally include wherein the confirmation message includes a status code indicating that data was found corresponding to the user.

In Example 57, the subject matter of any one or more of Examples 51-56 optionally include wherein the data management process is a network based service.

In Example 58, the subject matter of any one or more of Examples 51-57 optionally include wherein the data management process is a microservice.

Example 59 is at least one machine-readable medium comprising instructions, which when performed by a machine, cause the machine to perform operations for deleting data in electronic storage devices, the operations comprising:

receiving, over a network from a data management process, a data management request requesting that data corresponding to a user be deleted; forwarding the data management request to a plurality of other processes; determining data corresponding to the user, and marking the data to prevent modifications to the data; sending a confirmation message to the data management process; receiving a commit request; and responsive to the commit request, deleting the data.

In Example 60, the subject matter of Example 59 optionally includes wherein the operations comprise registering with the data management process.

In Example 61, the subject matter of Example 60 optionally includes wherein the operations of registering with the data management process comprises operations of determining a network address of the data management process from broadcast messages received from the data management process.

In Example 62, the subject matter of any one or more of Examples 59-61 optionally include wherein the data management request includes a list of two or more participant processes, and wherein the operations of forwarding the data management request to the plurality of other processes comprises the operations of forwarding the data management request to the two or more participant processes.

In Example 63, the subject matter of any one or more of Examples 59-62 optionally include wherein the operations of determining data corresponding to the user comprises operations of searching metadata for data corresponding to the user.

In Example 64, the subject matter of any one or more of Examples 59-63 optionally include wherein the confirmation message includes a status code indicating that data was found corresponding to the user.

Example 65 is a device for deleting data in electronic storage devices, the device comprising: means for receiving, over a network from a data management process, a data management request requesting that data corresponding to a user be deleted; means for forwarding the data management request to a plurality of other applications; means for determining data corresponding to the user, and marking the data to prevent modifications to the data; means for sending a confirmation message to the data management process; means for receiving a commit request; and responsive to the commit request, means for deleting the data.

In Example 66, the subject matter of Example 65 optionally includes means for registering with the data management process.

In Example 67, the subject matter of Example 66 optionally includes wherein means for registering with the data management process comprises means for determining a network address of the data management process from broadcast messages received from the data management process.

In Example 68, the subject matter of any one or more of Examples 65-67 optionally include wherein the data management request includes a list of two or more participant processes, and wherein means for forwarding the data management request to the plurality of other processes comprises forwarding the data management request to the two or more participant processes.

In Example 69, the subject matter of any one or more of Examples 65-68 optionally include wherein means for determining data corresponding to the user comprises means for searching metadata for data corresponding to the user.

In Example 70, the subject matter of any one or more of Examples 65-69 optionally include wherein the confirmation message includes a status code indicating that data was found corresponding to the user.

Example 71 is a method for deleting data on multiple network-based processes, the method comprising: at a user device, using one or more processors:

sending a delete request to delete all data associated with a user to a data management process, the data management process sending the delete request to a plurality of other processes previously registered with the data management process; receiving a message indicating that the delete request was successful; and creating a Graphical User Interface (GUI) indicating that the delete was successful.

Example 72 is a method of Example 71, wherein the plurality of other processes are in a single process domain.

Example 73 is a device for deleting data on multiple network-based processes, the device comprising: a processor; a memory, including instructions, which when performed by the machine, causes the machine to perform operations to: send a delete request to delete all data associated with a user to a data management process, the data management process sending the delete request to a plurality of other processes previously registered with the data management process; receive a message indicating that the delete request was successful; and create a Graphical User Interface (GUI) indicating that the delete was successful.

In Example 74, the subject matter of Example 73 optionally includes wherein the plurality of other processes are in a single process domain.

Example 75 is at least one machine readable medium, comprising instructions, which when performed by a machine, causes the machine to perform operations to: send a delete request to delete all data associated with a user to a data management process, the data management process sending the delete request to a plurality of other processes previously registered with the data management process; receive a message indicating that the delete request was successful; and create a Graphical User Interface (GUI) indicating that the delete was successful.

In Example 76, the subject matter of Example 75 optionally includes wherein the plurality of other processes are in a single process domain.

Example 77 is a device for deleting data on multiple network-based processes, the device comprising: means to send a delete request to delete all data associated with a user to a data management process, the data management process sending the delete request to a plurality of other processes previously registered with the data management process; means to receive a message indicating that the delete request was successful; and means to create a Graphical User Interface (GUI) indicating that the delete was successful.

In Example 78, the subject matter of Example 77 optionally includes wherein the plurality of other processes are in a single process domain.

What is claimed is:

1. A system for deleting data in electronic storage devices comprising:
   a processor;
   a memory, the memory communicatively coupled to the processor and comprising instructions, which when performed by the processor, cause the processor to perform a data management process, the data management process to cause the processor to perform operations comprising:
   sending advertisement packets to other processes in a domain;
   receiving registration packets from a plurality of participant processes in the domain, the registration packets responsive to the advertisement packets;
   receiving, over a network from a user device, a data management request requesting that data corresponding to a user be deleted;
   selecting a set of two or more participant processes from e plurality of participant processes based upon the registration packets;
   sending the data management request to each participant process in the set of two or more participant processes;
   receiving confirmation messages from each participant process in the set of two or more participant processes, the confirmation messages for each particular participant process each including an indication of whether data corresponding to the user is stored by the particular participant process; and
   sending a commit message to each particular one of the set of two or more of the participant processes that responded indicating that data corresponding to the user is stored by the particular participant process, to instruct the participant processes to delete any data corresponding to the user; and
   sending a notification to the user device that the request is complete.

2. The system of claim 1, wherein the operations of selecting the set of two or more participant processes comprises the operations of selecting all processes in the plurality of participant processes.

3. The system of claim 1, wherein the notification is sent to a notification process.

4. The system of claim 1, wherein the notification is a push notification.

5. The system of claim 1, wherein at least one process of the set of two or more participant processes is also executing on the processor.

6. The system of claim 1, wherein the data management process is a network based service.

7. The system of claim 1, wherein the data management process is a microservice.

8. A method of deleting data in electronic storage devices, the method performed by a data management process executed by at least one processor, the method comprising:
   using the at least one processor:
   sending advertisement packets to other processes in a domain;
   receiving registration packets from a plurality of participant processes in the domain, the registration packets responsive to the advertisement packets;
   receiving, over a network from a user device, a data management request requesting that data corresponding to a user be deleted;
   selecting a set of two or more participant processes from the plurality of participant processes based upon the registration packets;
   sending the data management request to each participant process in the set of two or more participant processes;
   receiving confirmation messages from each participant process in the set of two or more participant processes, the confirmation messages for each particular participant process each including an indication of whether data corresponding to the user is stored by the particular participant process; and
   sending a commit message to each particular one of the set of two or more of the participant processes that responded indicating that data corresponding to the user is stored by the particular participant process to instruct the participant processes to delete any data corresponding to the user; and
   sending a notification to the user device that the request is complete.

9. The method of claim 8, wherein selecting the set of two or more participant processes comprises selecting all processes in the plurality of participant processes.

10. The method of claim 8, wherein the notification is sent to a notification process.

11. The method of claim 8, wherein the notification is a push notification.

12. The method of claim 8, wherein the data management process is executing on a same processor of the at least one processor as at least one process of the set of two or more participant processes.

13. The method of claim 8, wherein the data management process is executing on a different processor of the at least one processor as at least one process of the set of two or more participant processes.

14. The method of claim 8, wherein the data management process is a network based service.

15. The method of claim 8, wherein the data management process is a microservice.

16. At least one non-transitory machine-readable medium for deleting data in electronic storage devices, the machine-readable medium including instructions, which when performed by a machine causes the machine to execute a data management process that performs operations comprising:
- sending advertisement packets to other processes in a domain;
- receiving registration packets from a plurality of participant processes in the domain, the registration packets responsive to the advertisement packets;
- receiving, over a network from a user device, a data management request requesting that data corresponding to a user be deleted;
- selecting a set of two or more participant processes from the plurality of participant processes based upon the registration packets;
- sending the data management request to each participant process in the set of two or more participant processes;
- receiving confirmation messages from each participant process in the set of two or more participant processes the confirmation messages for each particular participant process each including an indication of whether data corresponding to the user is stored by the particular participant process; and
- sending a commit message to each particular one of the set of two or more of the participant processes that responded indicating that data corresponding to the user is stored by the particular participant process, to instruct the participant processes to delete any data corresponding to the user; and
- sending a notification to the user device that the request is complete.

17. The non-transitory machine readable medium of claim 16, wherein the operations of selecting the set of two or more participant processes comprises selecting all processes in the plurality of participant processes.

18. The non-transitory machine-readable medium of claim 16, wherein the notification is sent to a notification process.

19. The non-transitory machine-readable medium of claim 16, wherein the notification is a push notification.

20. The non-transitory machine-readable medium of claim 16, wherein the data management process is executing on a same machine as at least one process of the set of two or more participant processes.

21. The non-transitory machine-readable medium of claim 16, wherein the data management process is executing on a different machine as at least one process of the set of two or more participant processes.

22. The non-transitory machine-readable medium of claim 16, wherein the data management process is a network based service.

23. The non-transitory machine-readable medium of claim 16, wherein the data management process is a microservice.

* * * * *

UNITED STATES PATENT AND TRADEMARK OFFICE
CERTIFICATE OF CORRECTION

PATENT NO. : 10,531,288 B2
APPLICATION NO. : 16/092853
DATED : January 7, 2020
INVENTOR(S) : Dzung D Tran It is certified that error appears in the above-identified patent and that said Letters Patent is hereby corrected as shown below:

In the Claims

In Column 19, Line 52, in Claim 1, delete "e" and insert --the-- therefor

In Column 20, Line 44, in Claim 8, delete "process" and insert --process,-- therefor In Column 21, Line 20, in Claim 16, delete "processes" and insert --processes,-- therefor Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*